Patented Oct. 17, 1939

2,176,443

UNITED STATES PATENT OFFICE 2,176,443

VAT DYESTUFFS OF THE DIPYRAZOLANTHRONE SERIES

Werner Zerweck, Frankfort-on-the-Main-Fechenheim, and Eduard Gofferjé, Frankfort-on-the-Main, Germany, assignors to General Aniline Works, Inc., New York, N. Y., a corporation of Delaware No Drawing. Application June 3, 1937, Serial No. 146,200. In Germany June 9, 1936

2 Claims. (Cl. 260—312)

Our invention relates to new vat dyestuffs of the dipyrazolanthrone series, more particularly to those of the type N-cyclohexyl-N'-alkyl-dipyrazolanthrone.

They are obtained by introducing according to known methods into the molecule of the dipyrazolanthrone a cyclohexyl group and into the molecule of the intermediate product thus obtained an alkyl group.

The new dyestuffs thus obtained are distinguished from the analogous dyestuffs not containing a cyclohexyl group by a better solubility of their leuco compounds and by better fastness properties and more yellowish shades of the dyeings obtained therewith.

In order to further illustrate our invention the following example is given, the parts being by weight.

Example 530 parts of the potassium salt of dipyrazolanthrone of 97% strength are mixed with 69 parts of dry potassium carbonate, about 5000 parts of o-dichloro-benzene and 620 parts of the cyclohexylester of benzenesulfonic acid (prepared by acting with the sodium salt of cyclohexanol on benzenesulfonic acid chloride) and the mixture is heated to about 120-125° C. for about 8-10 hours while stirring. The reaction product formed is filtered off while hot, the adherent solvent is removed by steam distillation and the residue is extracted with boiling water.

To the intermediate product thus obtained, which is an orange-yellow powder, 850 parts of caustic potash are added and the mixture is milled for some time in order to form the potassium salt which is dried in vacuo at about 70° C.

640 parts of the potassium salt of the N-monocyclohexyl-dipyrazolanthrone thus obtained are mixed with o-dichlorobenzene in order to form a homogeneous paste, 530 parts of the ethylester of p-toluene-sulfonic acid are added and the mixture is heated to about 120-125° C. for some time. Then the reaction product formed is filtered off while hot, washed with hot o-dichlorobenzene, extracted with boiling water and dried.

The dyestuff thus obtained, N-cyclohexyl-N'-ethyl-dipyrazolanthrone, is when dry a dark red powder, soluble in concentrated sulfuric acid with an orange-red color, and dyes cotton from a blue vat bright red shades. When the dyeings are treated with a soap solution, the shades are practically not changed, whereas the shades of dyeings obtained with N-diethyldipyrazolanthrone turn to blue-red when treated in the same manner.

By employing as first reaction component the benzene-sulfonic acid esters of 1,2-methyl-cyclohexanol or of the corresponding isomeric and alkyl-homologous compounds, similar dyestuffs are obtained.

The methylester of benzene-sulfonic acid used as second reaction component yields more yellowish dyestuffs, whereas the dyestuffs prepared by employing the propylester of benzene-sulfonic acid as second reaction component exhibit similar shades as the dyestuffs containing the ethyl group.

We claim:

1. An N-cyclohexyl-N'-alkyl-dipyrazolanthrone, which dyestuff is distinguished by the good solubility of its leuco compound and yields on cotton bright yellowish red shades of good fastness properties.

2. The vat dyestuff, N-cyclohexyl-N'-ethyl-dipyrazolanthrone, which is, when dry, a dark red powder soluble in concentrated sulfuric acid with an orange red color and dyes cotton from a blue vat bright red shades.

WERNER ZERWECK.
EDUARD GOFFERJÉ.